United States Patent [19]

Morrison

[11] Patent Number: 4,864,776
[45] Date of Patent: Sep. 12, 1989

[54] RAIL GRINDING APPARATUS
[75] Inventor: William R. B. Morrison, Queensland, Australia
[73] Assignee: Winders, Barlow and Morrison Pty. Ltd., Brisbane, Australia
[21] Appl. No.: 108,146
[22] Filed: Oct. 14, 1987
[30] Foreign Application Priority Data Aug. 21, 1987 [AU] Australia ................. PI3892

[51] Int. Cl.$^4$ ............................. B24B 23/00
[52] U.S. Cl. ................. 51/178; 51/241 LG; 51/165.76
[58] Field of Search .............. 51/178, 241 LG, 241 S, 51/34 E, 34 L, 74 R, 72 R, 98 R, 165.71, 165.74, 165.76, 165.77, 165.8

[56] References Cited
U.S. PATENT DOCUMENTS 3,888,051  6/1975  Belthle .................. 51/165.8
4,729,196  3/1988  Chaseling .............. 51/241 S Primary Examiner—Frederick R. Schmidt
Assistant Examiner—Maurina Rachuba
Attorney, Agent, or Firm—Poms, Smith, Lande & Rose

[57] ABSTRACT

Improved rail grinding apparatus for correcting flatness errors in the slew bearings of large earthmoving machines is disclosed. The grinding apparatus includes a grinding wheel (22) rotated by a motor (24) and forced against a rail (13) by lead screws (28). The latter are controlled by means of displacement sensors (31) and associated control means (33 and 34) so as to grind a profile along the rail (13). The displacement sensors follow guide rails (29) which conform to the desired profile to be ground along the rail (13). The control means (33) may be interfaced with suitable computing means to modify the displacement of the lead screws (28) relative to the guide means (29).

11 Claims, 4 Drawing Sheets

RAIL GRINDING APPARATUS

BACKGROUND OF THE INVENTION

This invention relates to improved methods of and apparatus for machining rail bearing surfaces.

This invention has particular but not exclusive application to in-situ machining of upper and lower slew bearing rails of large earth moving machines with slewing superstructures, and for illustrative purposes particular reference will be made hereinafter to the in-situ machining of such rails. It is to be understood however that this invention could be utilized in other applications such as the machining of linear rails as well as circular rails.

Various techniques may be used to correct rail flatness, including re-machining of the rail surfaces or the rail mounting pads or the rails or segments thereof may be removed and remounted on their mountings with a variable thickness grout interposed therebetween. However the latter in-situ technique requires dismantling of the slew bearing and thus it is time consuming and expensive and can be justified only in the case of severe flatness deviations all around the bearing.

DESCRIPTION OF THE PRIOR ART

For linear rails, it is known to carry out in-situ machining of rails as is described in U.S. Pat. Nos. 1,562,558, 2,132,861, and 2,524,332. All of these specifications disclose methods of machining the surfaces of rails with machining apparatus controlled for depth of cut from the surfaces of the rails themselves. This has the disadvantage that existing irregularities in the rail surface may disturb the apparatus and produce irregularities in the completed surface.

Many earth moving machines with large slewing superstructures supported on base structures utilize slew bearings consisting of upper and lower circles or part circles of rails with bearing rollers therebetween. The bearing rollers are retained in spaced relationship around the rails by a cage assembly having interconnected inner and outer side plates between which the rollers extend. Generally the side plates are joined by pins passing through central bores in the rollers.

In such slew bearings failure of the bearing surface of the rollers or the rails may occur as a result of localised high contact stresses which may be due to lack of operative flatness in the rail circles. This may result from distortion of the supporting base structure or an uneven distribution of the applied load.

For example, a typical dragline slew bearing may have a segmented top rail comprising a one hundred and twenty degree front segment disposed symmetrically beneath the boom and a ninety degree rear segment. It has been found that in such bearings the peak loads in the front segment may occur at or adjacent the ends of the rails and these may be much greater than the load applied to the central portion of the rail.

In order to alleviate this problem which leads to premature failure of the rail ends and the rollers, manufacturers frequently taper the end portions of the rails. This has the effect of shifting the load peaks inwardly towards the center of the rail. However unduly high load concentrations may still occur. This can be alleviated to a large extent by forming a compound taper along the end portions of the rails. This is a difficult task since the rails are also tapered radially to provide accurate rolling motion between the rollers and rails. Such bearings also have extremely large physical dimensions.

Operative flatness of the rail bearing surfaces may deteriorate in service, as plastic distortion of the support structures may result from misuse, and distortion can also occur as a result of contraction distortion of welds following repair of the support structures.

At present most corrective machining processes can only be performed on existing bearings by dismantling the rails and by transporting the rail segments to a suitable machine shop. This is expensive and results in an unduly long down time for the machine. Alternatively, as described in our co-pending U.S. patent application Ser. No. 907,627, in-situ machining can be performed by inserting suitable machining apparatus into the cage assembly. That specification discloses a method in which a grinding head is biassed into engagement with a rail bearing surface, the depth of cut of the grinding head being limited by depth stops in the form of profile plates placed along the sides of the rail bearing surface.

SUMMARY OF THE PRESENT INVENTION

The present invention aims to alleviate the above-mentioned disadvantages associated with the presently available methods of forming or correcting rail surface flatness or profiles and to provide a method of and means for machining rail bearing surfaces which will be reliable and efficient in use. Other objects and advantages of this invention will hereinafter become apparent.

With the foregoing and other objects in view, this invention in one aspect resides broadly in machining apparatus for machining the bearing surface of a rail in a rolling element bearing assembly of the type having rolling elements caged between inner and outer side plates of a bearing cage, said machining apparatus including:

rail profile forming apparatus engageable with said bearing surface for machining said bearing surface;

a carriage assembly having connector means thereon for connecting said carriage assembly to said bearing cage and supporting said rail profile forming apparatus for movement with said bearing cage along said rail freely to and from said bearing surface;

displacement means for moving said rail forming apparatus to and from said rail bearing surface; profiled elongate guide means attachable to said rail adjacent said bearing surface;

monitoring means attached to said forming apparatus and associated with said profiled elongate guide means whereby movement of said forming apparatus to and from said profiled elongate guide means may be monitored; control means sensing the output from said monitoring means for controlling said displacement means whereby said forming apparatus may be moved in a controlled manner relative to said rail bearing surface to machine a selected longitudinal bearing surface profile.

Preferably, said bearing assembly is a roller bearing and said forming apparatus is a grinding wheel having a cylindrical body portion, although of course if desired the grinding wheel may be formed into a shape whereby a selected transverse rail profile such as a profile with relieved sections at the edges. The grinding wheel may have a cylindrical body portion and a curved end portion which cooperate to form a desired profile on said rail bearing surface.

Preferably, said carriage assembly includes a pair of supports between which said grinding wheel is rotatably supported, each said support being supported by a slide for movement to and from said rail bearing surface, said slides each being connectible to a respective one of said inner and outer side plates of said bearing cage. Of course, if desired, alternative support means such as a one piece frame may be used. Preferably, said displacement means is a screw thread associated with each said slide, each said screw thread being rotated by a servo-motor whereby rotation of the servo-motor may drive the screw for linear movement of said slide. Other displacement means such as linear motors may of course be used if desired.

Preferably, said monitoring means is in the form of a linear displacement transducer attached to said support yoke and having a plunger engageable with said profiled elongate guide means whereby changes in the distance between the support yoke and the profiled elongate guide means may be measured. Of course, other monitoring means, such as proximity probes, may be used if desired. Preferably, said servo-motor is controlled by a control system for movement of said slide to maintain said sensor at a constant displacement relative to the surface of said elongate guide means. The control system may also be provided with an input signal from an electrical input device such as a potentiometer or a keyboard whereby changes to said constant displacement may be effected.

Guide means, monitoring means and displacement means may be provided at each end of the cutting apparatus, whereby the transverse inclination of the cutting apparatus may be controlled.

Other input signals may also be provided to modify the profile cut by the machining apparatus relative to the profiled elongate guide means. For instance, position sensing means may be provided whereby the position of said machining apparatus along said rail bearing surface may be measured in a form suitable for input to a computer, and the computer may be programmed to provide an input to said control system whereby a variation to said constant displacement as a function of the position of said machining apparatus along said rail bearing surface may be produced. Alternatively, a computer may be used to perform the functions of the control systems. The computer may be programmed to accept inputs from the monitoring means, the position sensing means and other inputs, and to provide outputs suitable for controlling the displacement means.

Suitably, the carriage assembly may support a driving motor for rotating said grinding wheel. Of course, other driving means may be provided, such as a motor supported within the grinding wheel if desired.

In a further aspect, this invention resides in a method of machining the bearing surface of a rail in a rolling element bearing assembly including:

supporting machining apparatus on a carriage assembly;

connecting said carriage assembly to said bearing cage whereby said machining apparatus may be carried along the rail in an operative machining attitude;

providing profiled elongate guide means for defining the longitudinal profile performed by the machining apparatus along a rail section to be machined;

providing control means whereby the machining apparatus is guided relative to the elongate guide means;

actuating said machining apparatus and engaging said machining apparatus with said rail section until the desired profile is performed.

The carriage assembly may be supported by the roller cage of a roller bearing, the method further including securing the carriage means to the roller cage and arranging said guide means whereby said machining apparatus will remove projecting areas from said rail bearing surface and restore operative flatness thereto.

The control system may be arranged to position the cutting apparatus at a constant distance relative to the guide means whereby the machined surface of the rail bearing will follow the profile of the guide means. Alternatively, the control system may have other inputs whereby the cutting apparatus may be programmed to produce a deviation from the maintenance of a constant distance between the cutting apparatus and the guide means. The other inputs may include a manually-set input to adjust the depth of cut between passes of the cutting apparatus and a pre-programmed input whereby the deviation may be a function of other input parameters such as a measure of the distance along the rail bearing surface, or the power demand of the drive motor.

Preferably, said carriage means is connectible to the cage of a roller bearing and said support means is supported for reciprocal movement in a direction normal to the rail bearing surface to be machined. Said support means may include a pair of supports between which said grinding wheel is rotatably supported and each said support may be supported by slides parallel to the direction of movement and connected to fixed members on said carriage means. The carriage means may include a mounting assembly connected to the spaced inner and outer cage members of the roller bearing.

In another aspect of this invention resides broadly in control means for controlling rail grinding apparatus whereby a selected rail profile may be produced by controlling the movement of the machining apparatus to and from the surface of a rail, said control means including:

displacement means for moving said rail forming apparatus to and from said rail bearing surface;

profiled elongate guide means attachable to said rail adjacent said bearing surface;

monitoring means attached to said forming apparatus and associated with said profiled elongate guide means whereby movement of said forming apparatus to and from said profiled elongate guide means may be monitored;

control means sensing the output from said monitoring means for controlling said displacement means whereby said forming apparatus may be moved in a controlled manner relative to said rail bearing surface to machine a selected longitudinal bearing surface profile.

The method may further include the use of roller load measurement means supported on the roller cage to enable the effect of the machining operations on the roller load distribution to be measured from time to time. This effect may be evaluated and utilized to make decisions regarding the positioning of the elongate guide means or the adjustment of the control means before further machining is carried out. Thus an indication of the improvement in load distribution due to initial machining may be used to improve the load distribution due to further machining. Suitable roller load measurement means is described in U.S. Pat. No. 4,175,430.

BRIEF DESCRIPTION OF THE DRAWINGS

In order that this invention may be more readily understood and put into practical effect, reference will now be made to the accompanying drawings which illustrate a preferred embodiment of the invention, wherein.

DESCRIPTION OF THE PREFERRED EMBODIMENT

Figure 1:
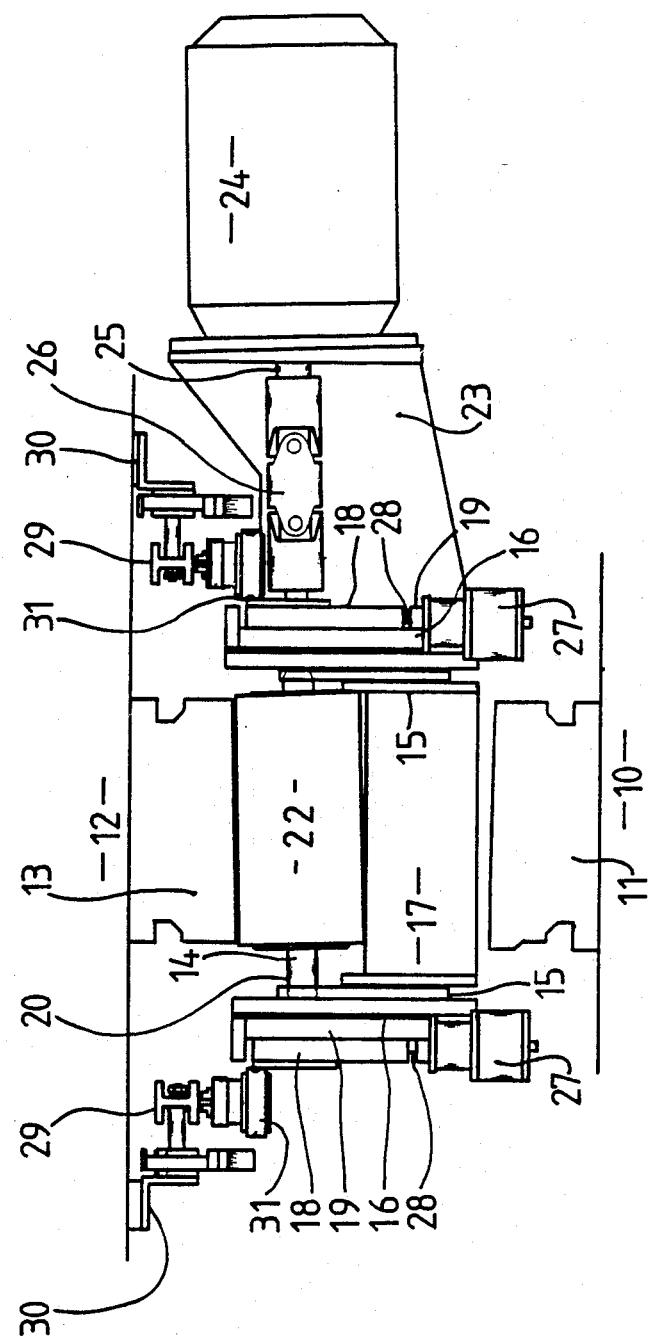
FIG. 1 is an end elevational view of machining apparatus supported on the cage of a slew bearing.
Figure 2:
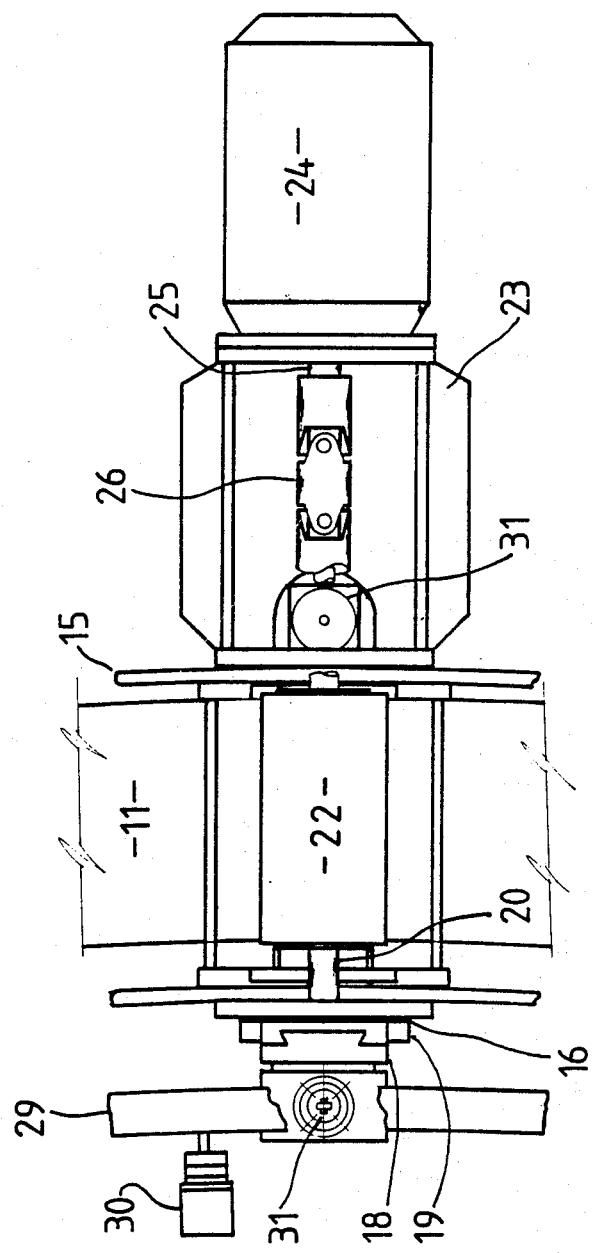
FIG. 2 is a sectional plan view of the machining apparatus illustrated in FIG. 1.
Figure 3:
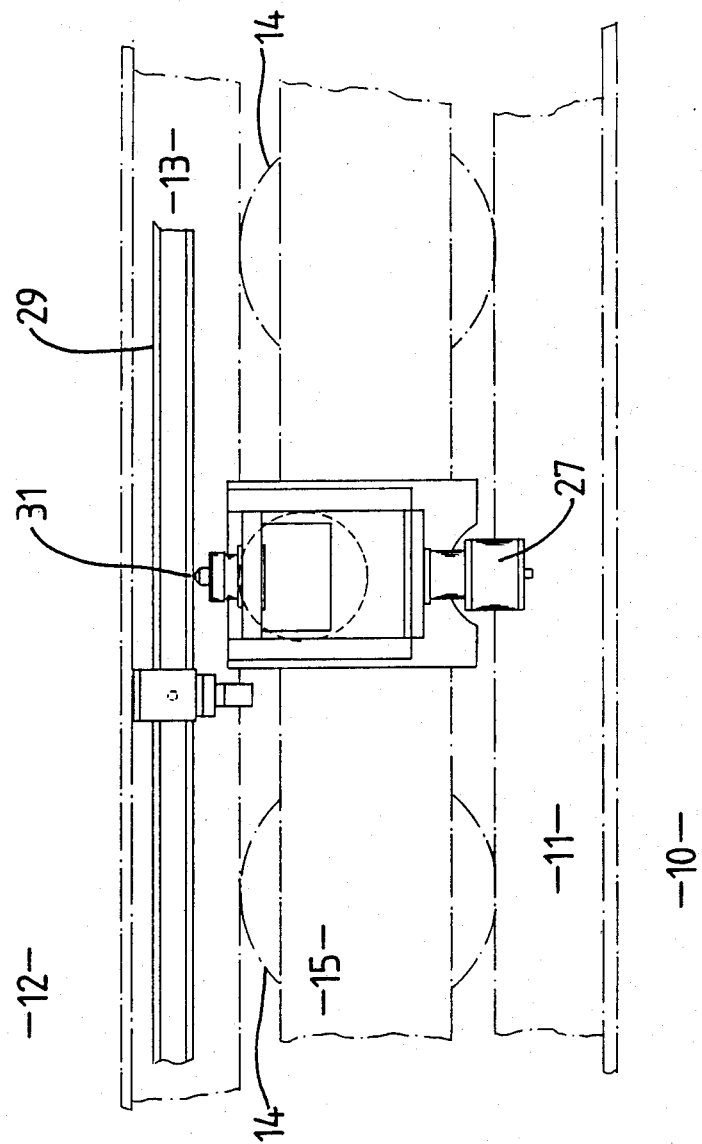
FIG. 3 is a sectional side elevational view of the machining apparatus illustrated in FIG. 1.
Figure 4:
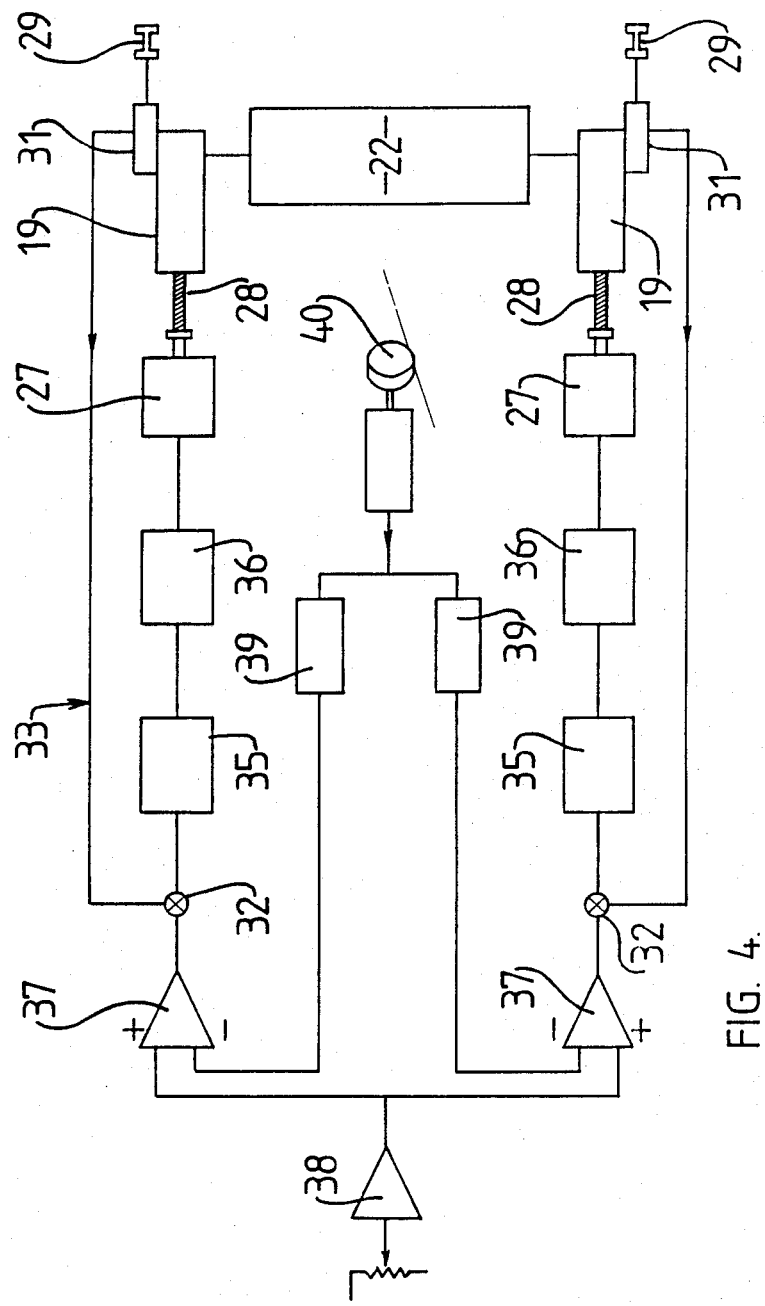
FIG. 4 is a block diagram of the control system for controlling the positioning of the grinding wheel.

As shown in FIGS. 1, 2, 3 and 4, the lower frame 10 of an excavator supports a lower slew rail 11. The superstructure 12 is supported on the upper slew rail 13 on rollers 14. The rollers 14 are located by a roller cage with side plates 15 connected by pins passing through the rollers 14.

Mounting plates 16 are attached to the side plates 15 after removal of a roller 14, and an internal spacer bracket 17 braces the side plates 15. Bearing carriers 18 slide vertically in slides 19 within the mounting plates 16. The grinding shaft 20 rotates in bearings 21 within the bearing carriers 18 and supports the grinding wheel 22. A bracket 23 attached to the outer side plate 15 supports the drive motor 24, and the motor shaft 25 is connected to the grinding shaft 20 through a cardan shaft 26.

Stepper motors 27 rotate low-backlash lead screws 28 to move the bearing carriers 18 relative to the mounting plates 16.

Guide rails 29 are mounted to the underside of the superstructure 12 by means of guide rail brackets 30. Spring-loaded displacement sensors 31 are mounted on the bearing carriers 18. Their sensing heads are forced against the guide rails 29 to measure changes in height between the guide rails 29 and the bearing carriers 18. Outputs from the sensors 31 are fed to the summing junctions 32 of servo control systems 33 and 34. Each servo control system 33 and 34 has an amplifier 35 and a stepper-motor driver 36 which produce the appropriate electrical signals to rotate the stepper motors 27 and, through the lead screws 28, move the bearing carriers 18 along the slides 19 until the feedback signals from the sensors 31 match the input signals fed to the summing junctions 32 by the operational amplifiers 37.

The operational amplifiers 37 sum input signals from a steady input signal from the cut-depth amplifier 38 and the microprocessors 39. The microprocessors 39 are fed with an input from a longitudinal displacement sensor 40 which measures the movement of the grinding apparatus along the upper slew rail 13. The microprocessors 39 are programmed to produce corrections to the height settings of the bearing carriers 18 such that modifications to the rail profile, such as smooth transitions between unground and ground sections of slew rail 13, may be effected.

A roller load transducer 41 is placed within a roller 14 and between successive cuts with the grinding wheel 22, the output from the transducer 41 as it passes along the rail 13 may be used to assess the trend of roller load distribution being achieved and to provide information on which adjustments to the positioning of the guide rails 29 or alterations to the programming of the microprocessors 39 may be made.

In use, a roller 14 and its pin are removed from the side plates 15 and the cutting apparatus is assembled in the resulting gap. The mounting plates 16 are attached to the side plates 15, and the grinding shaft 20 and the grinding wheel 22 are fitted between the bearing carriers 18. The bracket 23, the motor 24 and the cardan shaft 26 are added to the assembly. The guide rails 29 are mounted to the superstructure with guide rail brackets 30, and the height of the guide rails 29 is set to the desired relationship with the surface of the upper slew rail 13. The motor 24 is started, and the superstructure 12 is slewed to move the grinding wheel 22 along the surface of the upper slew rail 13 to cut the desired profile.

It will of course be realised that while the above has been given by way of illustrative example of this invention, all such and other modifications and variations thereto as would be apparent to persons skilled in the art are deemed to fall within the broad scope and ambit of this invention as is defined in the appended claims.

I claim:

1. Machining apparatus for machining the bearing surface of a rail in a rolling element bearing assembly of the type having rolling elements caged between inner and outer side plates of a bearing cage, said machining apparatus including: rail profile forming apparatus engageable with said bearing surface for machining said bearing surface;

a carriage assembly having connector means thereon for connecting said carriage assembly to said bearing cage and supporting said rail profile forming apparatus for movement with said bearing cage along said rail freely to and from said bearing surface;

power-operated actuating means for moving said rail forming apparatus to and from said rail bearing surface; profiled elongate guide means attachable to said rail adjacent to and along said bearing surface;

displacement transducer means attached to said forming apparatus and arranged to measure variations in the distance to and from said profiled elongate guide means whereby movement of said forming apparatus to and from said profiled elongate guide means may provide an output signal analogous to said movement;

control means for sensing said output signal, comparing the latter with a predetermined value to produce a difference signal and controlling said power-operated actuating means in accordance with said difference signal whereby said forming apparatus may be moved to a position relative to said rail bearing surface such that said output signal maintains a predetermined relationship to said predetermined value.

2. Machining apparatus according to claim 1, wherein said bearing assembly is a roller bearing and said forming apparatus is a grinding wheel having a cylindrical body portion.

3. Machining apparatus according to claim 2, wherein said carriage assembly includes a pair of supports between which said grinding wheel is rotatably supported, each said support being supported by a slide for movement to and from said rail bearing surface, said slides each being connectible to a respective one of said inner and outer side plates of said bearing cage.

4. Machining apparatus according to claim 3, wherein said power-operated actuating means is a servo-motor driving a screw thread.

5. Machining apparatus according to claim 4, wherein said servo-motor is controlled by said control means for movement of said slide to maintain said displacement transducer at a constant displacement relative to the surface of said elongate guide means.

6. Machining apparatus according to claim 5, wherein longitudinal position measurement means is provided whereby the position of said machining apparatus along said rail bearing surface may be measured in a form suitable for input to a computer.

7. Machining apparatus according to claim 6, wherein said computer is programmed to provide an input to said control system whereby a desired variation to said constant displacement as a function of the position of said machining apparatus along said rail bearing surface may be produced.

8. Machining apparatus according to claim 2, wherein said carriage assembly supports a driving motor for rotating said grinding wheel.

9. Machining apparatus according to claim 2, wherein said grinding wheel has a cylindrical body portion and a curved end portion which co-operate to form a desired profile on said rail bearing surface.

10. Machining apparatus according to claim 1, wherein roller load measurement means is supported on said bearing cage for indicating roller loads along said rail.

11. Control means for controlling rail grinding apparatus whereby a selected rail profile may be produced by controlling the movement of the machining apparatus to and from the bearing surface of a rail, said control means including:

actuating means for moving said rail forming apparatus to and from said rail bearing surface;

profiled elongate guide means attachable to said rail adjacent said bearing surface;

monitoring means attached to said forming apparatus and associated with said profiled elongate guide means whereby movement of said forming apparatus to and from said profiled elongate guide means may be monitored;

control means sensing the output from said monitoring means for controlling said actuating means whereby said forming apparatus may be moved in a controlled manner relative to said rail bearing surface to machine a selected longitudinal bearing surface profile.

* * * * *